UNITED STATES PATENT OFFICE.

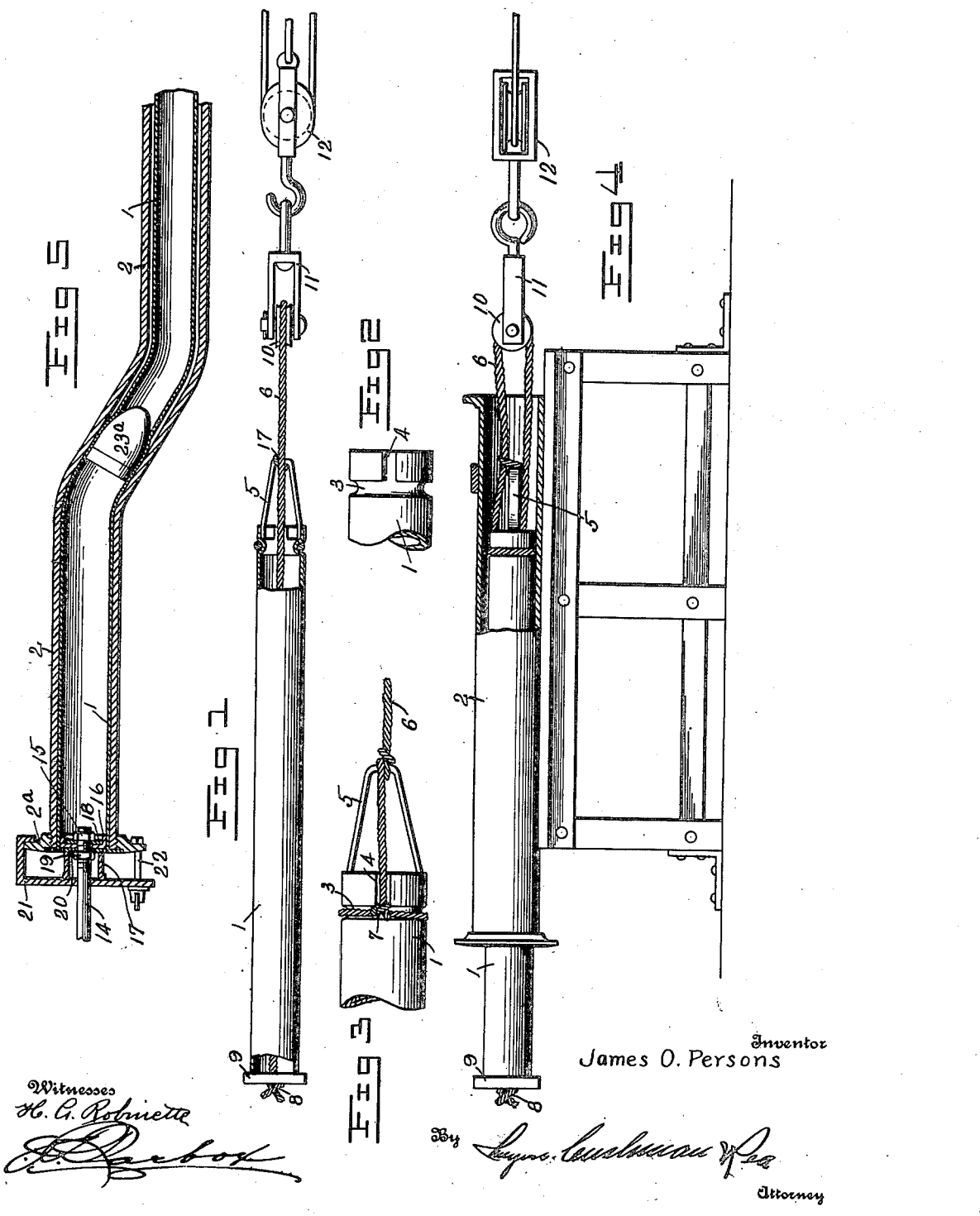

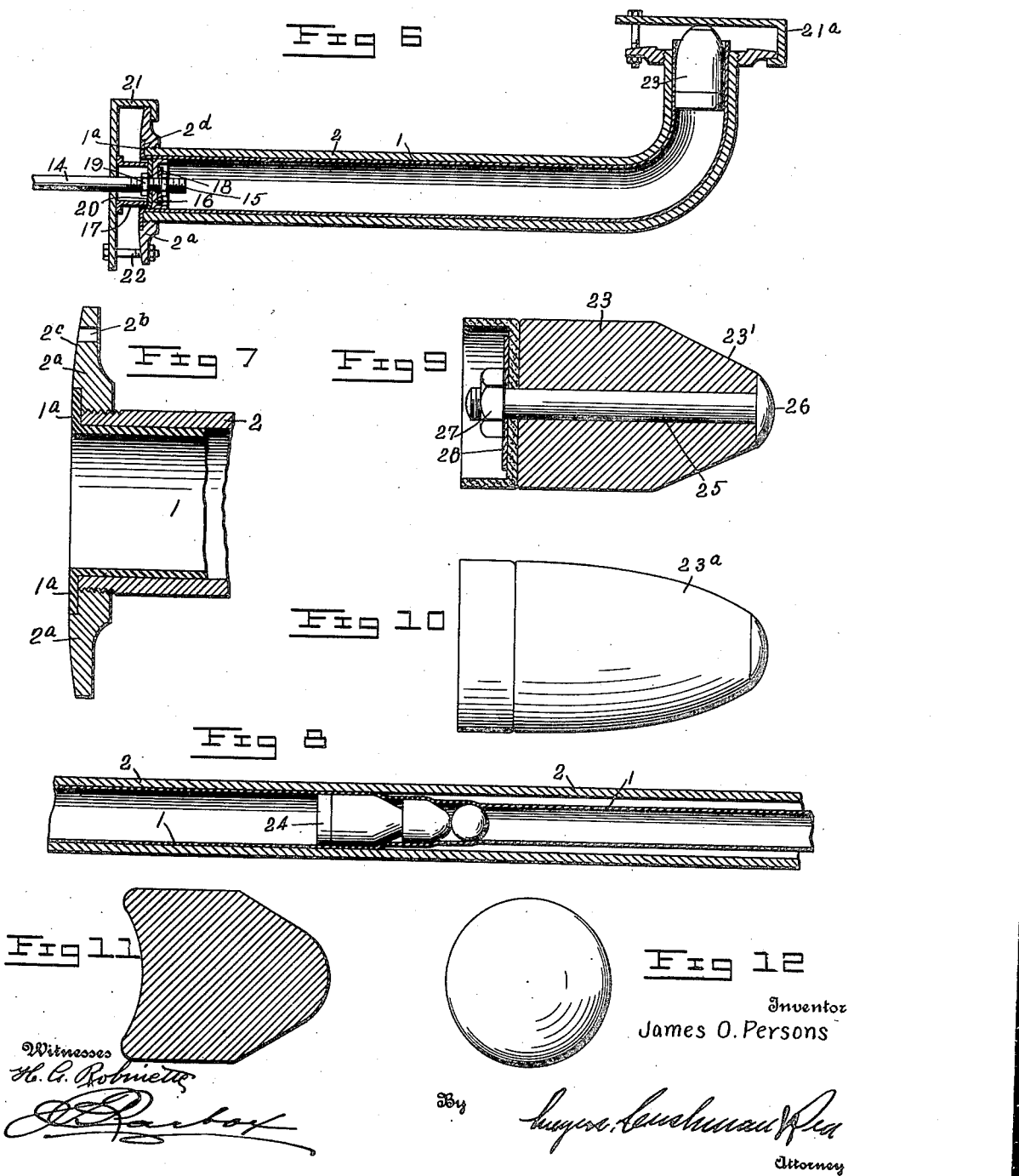

JAMES OTIS PERSONS, OF NORFOLK, VIRGINIA, ASSIGNOR TO AMERICAN PIPE LINING CORPORATION, OF NORFOLK, VIRGINIA, A CORPORATION OF VIRGINIA.

APPARATUS FOR LINING PIPES.

952,545.   Specification of Letters Patent.   Patented Mar. 22, 1910.

Original application filed October 14, 1908, Serial No. 457,761. Divided and this application filed May 1, 1909. Serial No. 493,437.

*To all whom it may concern:*

Be it known that I, JAMES OTIS PERSONS, a citizen of the United States, residing at Norfolk, in the county of Norfolk and State of Virginia, have invented new and useful Improvements in Apparatus for Lining Pipes, of which the following is a specification.

My invention relates to means for carrying out a method of lining pipes with lead or similar material, and more particularly, to means for carrying out a method for lining either straight or curved pipes after they have been cut, finished, or set in any desired structural relation. This method referred to forms the subject matter of my co-pending application Serial No. 457,761, of which this is a division.

The invention is especially well adapted for lining the various pipe lines found on ship board, but is not, of course, limited to such use, as it lends itself readily to widely varying classes of work.

Broadly considered the invention contemplates the provision of improved means for uniformly expanding a tube of malleable material, such as lead, from one diameter, to a greater predetermined diameter, throughout its length.

More specifically, the invention seeks to provide means for producing a lead or similar lining in a given pipe by inserting a lead tube of smaller diameter into said pipe, and then expanding said lead tube until it is forced into close contact with the walls of the outer pipe. It has heretofore been proposed to accomplish this result by hydraulic pressure, but it is found in practice, that, where this method is employed, air bubbles are formed between the walls of the two pipes, and hence the intimate contact required can not be obtained. It has also been proposed to line iron or similar pipes with lead, at the time of their manufacture into stock of standard length. This is accomplished by clamping the straight lengths of pipe in suitable vises, inserting the lead linings, and then expanding them by means of a tool or spreader carried by a mandrel. This method is obviously applicable only to straight pipe. Furthermore, it has been found that, when such pipe is cut for the purpose of fitting or setting the same, the lining becomes separated from the pipe at the point of cutting, and it is thereafter extremely difficult to cause it to adhere again in a satisfactory manner.

I have devised a method of lining which shall be applicable to curved, as well as straight pipe, and to pipe after it has been cut and set into its final position. In this way the necessity of cutting and marring the lining may be obviated. My method is equally as well adapted to repair work, *i. e.*, to lining old or corroded pipe, as to new work. By the use of my method air bubbles between the pipe and lining are eliminated, and a close union of the parts is secured.

The object of my invention is to provide apparatus for carrying out the above outlined method and it is this apparatus which forms the subject of this application.

In the accompanying drawings,—Figure 1 is a view partly in section showing my improved method of attaching a cable to the tube to be inserted in the pipe. Fig. 2 is a detail end view of such a tube on an enlarged scale. Fig. 3 is a similar view showing the cable in position. Fig. 4 is a side elevation partly in section showing the method of inserting a tube into the pipe to be lined. Fig. 5 is a central, longitudinal section illustrating the process of expanding the tube within the pipe. Fig. 6 is a similar view showing a carrying forward of the same idea. Fig. 7 is a sectional detail of the end of a finished pipe section with the lining in place. Fig. 8 is a longitudinal section similar to Fig. 5, but showing a slightly different method. Fig. 9 is a central longitudinal section of one form of spreader which I employ. Figs. 10, 11 and 12 are views showing other forms of spreaders adapted to certain classes of work.

Referring to the drawings in detail 1 designates the malleable tube, which is to form the lining, and which is usually made of lead or similar material, and 2 indicates the pipe to be lined. This pipe may be either iron, copper or other material, and may be either straight or provided with a number of bends.

From experiments heretofore made in inserting lead tubing into pipes it has been found that where the pipe is long and crooked it is very difficult to properly insert the tube. It has been found that if tension is applied to the front end of the tube the resistance offered to its passage through the pipe often results in rupturing the tube, and, on the other hand, if it is attempted to push the tube through the pipe by exerting a pressure on its rear end, the tube is apt to buckle and become distorted. To obviate these difficulties I have devised the method shown in Figs. 1 to 4, inclusive. Referring to these figures it will be seen that I form an annular groove 3 near one end of the tube, as by hammering, and a longitudinal groove 4 extends from the annular groove 3 to the end of the pipe. I then place a cable 6 around the tube so that it lies within the groove and knot it at 7 so that after passing around the tube it may lie in the groove 4 and extend in the direction of the end of the tube. These grooves are simply for the purpose of allowing the cable to lie flush with the outer surface of the tube so as to present no obstruction to the passage of the tube through the pipe. The other end of the cable 6 is led back through the inside of the tube and knotted as at 8, a block 9 being interposed between the knot and the end of the tube, as clearly shown in Figs. 1 and 4. It will be understood that the cable 6 is of a length considerably greater than the tube and that when its ends are attached to the tube, as above described, its middle portion forms a loop. In this loop I place a pulley 10 journaled in the block 11, which block may in turn be attached to a suitable sheaf 12, or other means by which a tractive force may be applied to said block. It will thus be seen that by pulling on the block 11 the tension in the two portions of the cable on opposite sides of the pulley 10 will be equalized, and the result will be the application of an equal force simultaneously to both ends of the tube 1. If desired, and particularly where the tubes are large, I may employ a strap or bail 5 soldered or otherwise secured to the end of the tube, and may tie the cable to this bail before securing it to the tube at 17. This is for the purpose of centralizing the pull on this end of the tube.

It will be understood, of course, that the tube is of considerably smaller diameter than the pipe in which it is inserted, and that after the tube has been inserted, it is necessary to expand the same into contact with the inner walls of the pipe. For this purpose I employ a device which I designate a spreader, and various forms of which are illustrated in Figs. 9, 10, 11 and 12. Referring to Fig. 9, which illustrates the type of device employed for straight pipes, 23 designates a cylindrical block having its front end tapered or cone shape, as indicated at 23'. A bolt 25, having a rounded head 26 passes centrally through the block 23, and is provided at its rear end with a nut 27. Under the nut 27 is a washer 28, and between the washer 28 and the block 23 is clamped a cup shaped leather disk, such as is used to form the packing for pump pistons and the like. In Fig. 10, I have illustrated a spreader of the same general shape, but the block 23ª instead of being cylindrical is more or less parabolic and the head of the bolt preferably conforms to the curve of the block, as shown.

Referring now to Figs. 5 and 6 I have illustrated a section of pipe 2 having a tube 1 inserted therein. After this tube has been drawn into the pipe, I insert a spreader 23 into one end of the tube and then also insert the end of a pipe 14, which is provided with a piston like packing, so as to cause it to fit the tube fluid tight. As shown, this packing consists of a leather disk 16 clamped between two plates 18 and 20, and held in position by means of nuts 15 and 19. It may be here stated that the end of the tube 1 is flattened out so as to form a flange 1ª, which fills a recess 2ᵈ in the flange 2ª of the pipe 2, as clearly shown in Fig. 7. By reference to this figure, it will also be seen that the outer face of the flange 2ª is preferably rounded off, as indicated at 2ᶜ. Consequently when the adjacent ends of two sections of pipe are arranged so that the flanges 1ª abut and bolts are inserted through the holes 2ᵇ in the flanges 2ª, a fluid tight joint will be formed between the flanges of the lead lining without the use of any gasket or other packing devices.

Referring again to Figs. 5 and 6 after inserting the pipe 14 in the end of the tube I slip over it a short piece of pipe 17 to act as a brace and over this I secure a clamp 21 attached at one side to the flange 2ª by means of a bolt 22. If therefore fluid pressure, such as hydraulic pressure be admitted through pipe 14 it will be seen that the spreader 23 or 23ª will be driven through the tube and will expand the same into contact with the walls of the pipe, as shown in Fig. 5. It will be particularly noted that owing to the travel of the spreader through the tube it is expanded progressively from one end to the other, and consequently all air bubbles which would tend to collect between the tube and pipe, are smoothed out and eliminated. In order to still further compact the tube and to secure an even more intimate contact with the pipe, I preferably employ the additional step illustrated in Fig. 6. This consists in providing a clamp 21ª at the exit end of the pipe so disposed that when the spreader 23 reaches this end of the pipe its movement will be arrested by the clamp. With the parts in this position hydraulic or other pressure is admitted to the pipe until the pressure very greatly exceeds that employed for driving the spreader through the tube. This results in forcing the malleable tubing into every irregularity on the inner surface of the pipe, and securing a very intimate contact therewith, and at the same time this operation serves as a pressure test to determine whether or not the finished pipe will stand the pressure for which it is designed; to this end suitable gages (not shown) are of course, employed. After this test pressure has been applied the clamp 21ᵃ is removed, the confined fluid allowed to escape, the tube 1 cut off at the proper length, and its end bent over to form a flange 1ᵃ, as above described.

Although the form of spreader shown in Fig. 10 will ordinarily suffice, for curved pipes, it may sometimes be desirable where the work is particularly complicated, or where the bends in the pipe are sharp, to employ a series of short spreaders operating one behind the other, as shown in Fig. 8. With this arrangement I prefer to make the spreaders of progressively increasing diameter, and the first of the spreaders may be simply a ball, as shown in Fig. 12. The intermediate spreaders may have a conical point and a concave base, as shown in Fig. 11 to receive the point of the next succeeding spreader, while the last spreader of the series is provided with the packing ring 24, so as to secure a fluid tight fit. It will be observed that a series of spreaders used in straight pipes give the same advantages that they give when they are used with curved pipe. These advantages result mainly from an increased flexibility of the spreader by virtue of its being made in sections, thus constituting a series of spreaders, if we consider each section a spreader, and from a decreased friction between the expanding surface and the surface of the tube being expanded on account of the decreased area of the surface of the spreader in contact with the tube. The flexibility resulting from the formation of the spreader in sections enables the pipe to freely pass over the irregularities in the tube being expanded or pipe being expanded, whether that pipe be straight or curved. The decreased friction means an easier and more efficient operation, as well as more accurate and better work, as there is less tendency for the tube being expanded to lag more at one side than another, and thus cause thin spots in the wall of the tube, or for the friction to become so great that the tube being expanded is drawn at a point adjacent the rear end of the spreader and the walls thinned. This thinning of the walls of the tube may result in a breaking of the tube in case the friction becomes too great. A further advantage of the use of a series of spreaders is the fact that when the lining tube is of a diameter so much smaller than the tube to be lined that the expansion is too great to be performed by a single spreader, by the use of a series of spreaders of progressively increasing diameter, the tube may be expanded at once into place as a lining. If single spreaders were used, three separate operations would be necessary in order to attain this result.

It will thus be seen that I have devised an improved apparatus for inserting the tube into the pipe to be lined, and also for expanding the same, so as to eliminate air bubbles and to secure the most perfect contact possible, and it is thought that the numerous advantages of my invention will be readily appreciated by those skilled in the art.

What I claim is,—

1. An apparatus for lining pipe by expanding within it a tube of lining material, comprising a series of spreaders of progressively increasing diameter adapted to be inserted in one end of the tube, a head for closing the end of the tube behind the spreaders, and means for applying fluid pressure to the tube between the head and the spreaders.

2. An apparatus for lining pipe by expanding within it a tube of lining material, comprising a series of spreaders of progressively increasing diameter adapted to be inserted in one end of the tube, the first of said spreaders being in the form of a ball, an intermediate spreader having a nose, a curved expanding surface and a concaved rear end, and the hindmost spreader having a nose adapted to engage said concaved rear end of an intermediate spreader, a curved expanding surface and a rear end adapted to serve as a piston, a head for closing the end of the tube behind the spreaders, and means for applying fluid pressure to the tube between the head and the spreaders for forcing them through the tube.

3. An apparatus for lining pipe by expanding within it a tube of lining material, comprising a series of spreaders adapted to be inserted in one end of the tube and having expanding surfaces adapted to contact with the walls of the tube for a distance less than the overall length of the spreaders, a head for closing the end of the tube behind the spreaders, and means for applying fluid pressure to the tube between the head and the spreaders for forcing the spreaders through the tube.

4. An apparatus for lining pipe by expanding within it a tube of lining material, comprising a spreader adapted to be inserted in one end of the tube, a head in the form of a piston for closing the end of the tube behind the spreader, means for securing said head in place, and means for applying fluid pressure to the tube between the head and the spreader comprising a screw threaded pipe passing through the piston and serving to hold the parts of the piston together.

5. An apparatus for lining pipe by expanding within it a tube of lining material, comprising a spreader adapted to be inserted in one end of the tube, a piston for closing the end of the tube behind the spreader, and means passing through the piston for applying fluid pressure to the tube between the rear end of the spreader and the piston for forcing the spreader through the tube, said means comprising a pipe threaded into the piston, and means on the pipe for holding the parts of the piston together.

6. An apparatus for lining pipe by expanding within it a tube of lining material, comprising a spreader adapted to be inserted in one end of the tube, a head for closing the end of the tube behind the spreader, means for applying fluid pressure to the tube between the head and the rear end of the spreader, and means for arresting the spreader before it emerges from the other end of the tube, whereby the fluid pressure is confined within the tube.

7. An apparatus for lining pipe by expanding within it a tube of lining material, comprising a spreader adapted to be inserted in one end of the tube, a head for closing the end of the tube behind the spreader, means for applying fluid pressure to the tube between the head and the rear end of the spreader for forcing the spreader through the tube, and means comprising an abutment in the path of the spreader for arresting it before it emerges from the other end of the tube, whereby the fluid pressure is confined within the tube, and may be raised to force the lining into intimate contact with the walls of the pipe.

8. An apparatus for lining pipe by expanding within it a tube of lining material, comprising a spreader adapted to be inserted in one end of the tube, a head for closing the end of the tube behind the spreader, means for applying fluid pressure to the tube between the head and the rear end of the spreader for forcing the spreader through the tube, and means comprising an abutment clamped to the end of the pipe in the path of the spreader for arresting it before it emerges from the other end of the tube, whereby the fluid pressure is confined within the tube and may be raised to force the lining into intimate contact with the walls of the pipe.

9. An apparatus for lining pipe by expanding within it a tube of lining material, comprising a spreader adapted to be inserted in one end of the tube, said spreader having a curved expanding surface of a less length than the overall length of the spreader, and having a rear end adapted to serve as a piston, a piston for closing the end of said tube behind said spreader adapted to be clamped to the end of the pipe to be lined, a fluid inlet communicating with a source of fluid pressure passing through the body of the piston for admitting fluid pressure to the tube between the piston and the rear end of the spreader for driving said spreader through the tube, and a clamp for holding the piston in place.

10. An apparatus for expanding a tube comprising a spreader, a packing on the spreader, a bolt passing through the spreader and securing the packing thereto, the head of the bolt forming the nose of the spreader, and means for forcing the spreader through the tube.

In testimony whereof I have hereunto set my hand in presence of two subscribing witnesses.

JAMES OTIS PERSONS.

Witnesses:
ARTHUR J. MORRIS,
SHELTON N. WOODARD.